United States Patent Office 3,324,145
Patented June 6, 1967

3,324,145
PROCESS FOR PREPARATION OF DIOXOLANES
Norman L. Madison, Midland, Mich., assignor to The Dow Chemical Company, Midland, Mich., a corporation of Delaware
No Drawing. Filed Oct. 2, 1964, Ser. No. 401,219
4 Claims. (Cl. 260—340.9)

This invention relates to a novel process for preparing a dioxolane directly from a perhaloacetone and an epoxyalkane and to novel dioxolanes prepared thereby.

Simmons and Wiley, J. Am. Chem. Soc., 82, 2288 (1960), reported that dioxolanes such as 2,2-bis(trifluoromethyl)-1,3-dioxolane exhibit an excellent thermal stability and are substantially unreactive toward acids, bases and oxidizing agents. However, as reported by these workers, such dioxolanes are prepared in a two-step process by reaction of ethylene chlorohydrin with hexafluoroacetone to give the corresponding hemiacetal followed by addition of potassium carbonate to effect cyclization to the dioxolane. By this alleged process, the yield of 2,2-bis(trifluoromethyl)-1,3-dioxolane was only about 16 percent.

It is a principal object of the present invention to provide a novel process for preparing dioxolanes in high yield and high purity.

It is another object of the present invention to provide a novel process for preparing dioxolanes wherein there is good conversion of reactants to the corresponding dioxolanes and substantially no loss of reactant materials from undesirable side reactions, degradation and the like.

These and other objects and advantages readily will become apparent from the detailed description of the invention presented hereinafter.

Generally, in accordance with the present invention a perhaloacetone and an epoxyalkane are reacted together under autogenous pressures at a temperature of from about 0° C. to about 150° C. for a period of up to about 24 hours or more.

Ordinarily, in this novel process, the perhaloacetone and epoxyalkane reactants, at gram mole proportions of perhaloacetone/epoxyalkane from about 1/5 to about 5/1, preferably at about 1/1, are reacted at temperatures of from about room temperature (~18 to 25° C.) to about 150° C., preferably from about 50 to about 100° C. for a period of from several minutes (~5–10 minutes) to about 48 hours, preferably from about 1 to about 24 hours, in a sealed reactor under the vapor pressure of the reactants employed. Substantially quantitative recovery of unused reactants and dioxolane product, with conversion to the dioxolane based on consumption of perhaloacetone of greater than 50–60 percent, readily are realized. An important advantage of the present novel one-step process is that the product as produced is of a high purity, i.e. 98 percent or higher.

This process proceeds readily, as set forth hereinbefore, by direct reaction of the perhaloacetone and epoxyalkane reactant members in the absence of any catalyst or reaction promoter and usually is carried out using only the reactant materials.

However, if desired, relatively large quantities of a weak base catalyst material, i.e. at a minimum about 1.5 mole percent, usually from about 1.5 to about 10 mole percent, based on the total reaction mass can be employed. The use of these quantities of catalyst serves to markedly increase the rate of conversion to the dioxolane and is accompanied by co-production of only relatively small amounts of the corresponding perhaloacetone-epoxyalkane copolymer.

The term "halo" as used herein with reference to the ketone reactants is meant to include chloro- and fluoro-substituents. Perhaloacetones suitable for use in the present invention include perfluoroacetone (hexafluoroacetone) and perchloroacetone (hexachloroacetone) as well as mixed chloro- and fluoro-substituted perhalosubstituted acetones. Illustrated mixed perhalosubstituted acetones include dichlorotetrafluoroacetone, tetrachlorodifluoroacetone, monochloropentafluoroacetone and the like.

Epoxyalkanes (alkylene oxides) suitable for use in preparing the present composition include aliphatic epoxyalkanes having from 2 to about 8 carbons or more in the hydrocarbon chain; 1,2-epoxyethane (ethylene oxide), 1,2-epoxypropane (propylene oxide) and epoxybutane (butylene oxide) are particularly effective epoxyalkane reactants.

Weak base catalyst materials found to be particularly suitable for use in the present process are alkali metal fluorides such as cesium fluoride, sodium fluoride and rubidium fluoride, alkali metal acetates such as sodium acetate or potassium acetate, alkali metal carbonates, alkaline earth metal carbonates, pyridine, quaternary ammonium salts and the like.

If desired, the reaction can be carried out in the presence of an inert solvent, e.g. diethyl ether.

The following examples will serve to further illustrate the present invention but are not meant to limit it thereto.

*Example 1.*—About 1.5 grams perfluoroacetone and about 0.4 gram ethylene oxide were condensed under an absolute pressure of about 0.1 micron mercury into a 30 cubic centimeter ampoule. This provided a

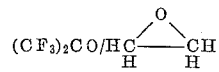

gram mole ratio of about 1. The tube was sealed and immersed over about one third of its length in a vertical position in a steam bath (~100° C.) being maintained under these conditions for several hours.

At the end of this period the reactor tube was opened to a low pressure line and the volatile materials, i.e. primarily unreacted starting materials, removed. The remaining product liquid then was removed from the ampoule by distillation providing a product which upon subsequent characterization by vapor phase chromatography, infrared analysis and nuclear magnetic resonance was found to be 2,2-bis(trifluoromethyl)1,3-dioxolane of greater than 98 percent purity. Total product yield, i.e. recovered perfluoroacetone and ethylene oxide starting material was substantially quantitative.

This reaction was repeated at a temperature of about 150° C. with substantially the same results.

*Example 2.*—Following the general procedure described in Example 1, 1,2-epoxypropane (propylene oxide), 1.7 grams, was reacted directly with perfluoroacetone, 4.5 grams, in the absence of a catalyst. The resulting liquid product analyzed to give C, 32.4%; H, 2.73%; F, 49.3%. Theory for 4-methyl-2,2-bis(trifluoromethyl) 1,3-dioxolane is C, 32.17%; H, 2.67%; F, 50.9%. Infrared analysis, vapor phase chromatography and nuclear magnetic resonance supported the proposed structure and indicated the product to have a purity greater than 98 percent. Yield of the dioxolane product and recovered useable starting materials was substantially quantitative.

In a separate run employing the same procedure, 1,2-epoxybutane (butylene oxide), 0.8 gram and perfluoroacetone (~2 grams) were reacted. The resulting liquid product after recovery by distillation analyzed to have C, 35.4%; H, 3.41%; F, 47.9%. Theoretical elemental analysis for 4-ethyl-2,2-bis(trifluoromethyl)-1,3-dioxolane is C, 35.3%; H, 3,36%; F, 46.1%. The proposed structure was supported by vapor phase chromatography, infrared analysis and nuclear magnetic resonance. Product purity was indicated to be greater than 99 percent, with about 100 percent total yield and conversion of about 72 percent.

*Example 3.*—Perfluoroacetone (6 grams) and ethylene oxide (1.6 grams) were condensed under an absolute pressure of about 0.1 micron mercury into a 125 cubic centimeter tube containing about 0.2 gram (~1.8 mole percent of total reaction mixture) of cesium fluoride. This provided a

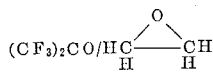

gram mole ratio of about 1. The tube was sealed and immersed over about one third of its length in a vertical position in a steam bath (~100° C.), being maintained under these conditions for several hours.

At the end of this period the reactor tube was opened to a low pressure line and the volatile materials removed. The remaining product liquid was removed from the ampoule by distillation. This gave about 4.5 grams of a material which was found upon subsequent characterization by vapor phase chromatography, infrared analysis and nuclear magnetic resonance to be 98 percent pure 2,2-bis(trifluoromethyl)-1,3-dioxolane. Product yield was substantially quantitative with a conversion to the dioxolane of about 60 percent.

In a manner similar to that described for the foregoing examples monochloropentafluoroacetone, dichlorotetrafluoroacetone, tetrachlorodifluoroacetone and other chlorofluoroperhalogenated acetones and perchloroacetone can be reacted with ethylene oxide, propylene oxide, butylene oxide and other epoxyalkanes and mixtures thereof in accordance with the present novel process to provide the corresponding dioxolane.

Various modifications can be made in the present invention without departing from the spirit or scope thereof for it is understood that I limit myself only as defined in the appended claims.

I claim:
1. A process for preparing a dioxolane which comprises:
   (a) preparing a mixture of a perhaloacetone and an epoxyalkane, the gram mole proportions of said acetone and said epoxyalkane ranging from about 1/5 to about 5/1, said epoxyalkane having a carbon atom content ranging from about 2 to about 8,
   (b) maintaining this mixture at a maximum temperature of about 150° C. for a period of from about several minutes to about 48 hours under a vapor pressure of the reaction mixture, and
   (c) recovering the corresponding dioxolane from the reaction mixture.

2. The process as defined in claim 1 wherein the perhaloacetone is perfluoroacetone and the epoxyalkane is a member selected from the group consisting of ethylene oxide, propylene oxide and butylene oxide.

3. A process for preparing a dioxolane which comprises:
   (a) preparing a mixture of perfluoroacetone and an epoxyalkane selected from the group consisting of ethylene oxide, propylene oxide and butylene oxide, the gram mole proportions of said perfluoroacetone and said epoxyalkane being 1/1,
   (b) maintaining this mixture at a temperature of from about 100 to about 150° C. for a period of from about 1 to about 24 hours under a vapor pressure of the reaction mixture, and
   (c) recovering the corresponding dioxolane from the reaction mixture.

4. The process as defined in claim 3 and including the step of adding cesium fluoride catalyst material to the mixture of said perfluoroacetone and said epoxyalkane, the amount of said catalyst ranging from about 1.5 to about 10 mole percent, based on the total reaction mass.

References Cited
UNITED STATES PATENTS 2,925,424   2/1960   Simmons _____ 260—340.9 X

OTHER REFERENCES

Bogert et al.: Journal of American Chemical Society, vol. 55 (1933), pp. 3741–45.

ALEX MAZEL, *Primary Examiner.*

NICHOLAS S. RIZZO, *Examiner.*

JAMES H. TURNIPSEED, *Assistant Examiner.*

Disclaimer

3,324,145.—*Norman L. Madison*, Midland, Mich. PROCESS FOR PREPARATION OF DIOXOLANES. Patent dated June 6, 1967. Disclaimer filed Mar. 8, 1968, by the assignee, *The Dow Chemical Company*.

Hereby enters this disclaimer to claim 4 of said patent.
[*Official Gazette July 2, 1968.*]